United States Patent [19]

Yamada

[11] Patent Number: 5,333,471
[45] Date of Patent: Aug. 2, 1994

[54] ADSORPTION COOLING SYSTEM

[75] Inventor: Yasuo Yamada, Isesaki, Japan

[73] Assignee: Sanden Corp., Isesaki, Japan

[21] Appl. No.: 66,984

[22] Filed: May 25, 1993

[30] Foreign Application Priority Data

| May 26, 1992 | [JP] | Japan | 4-133778 |
| May 26, 1992 | [JP] | Japan | 4-133785 |
| May 26, 1992 | [JP] | Japan | 4-133798 |
| May 26, 1992 | [JP] | Japan | 4-133802 |
| Aug. 11, 1992 | [JP] | Japan | 4-214263 |
| Aug. 13, 1992 | [JP] | Japan | 4-215836 |
| Aug. 25, 1992 | [JP] | Japan | 4-226055 |

[51] Int. Cl.$^5$ ............................................. F25B 9/14
[52] U.S. Cl. ..................................... 62/476; 62/485;
62/146; 62/148; 62/239
[58] Field of Search ................. 62/480, 481, 485, 141,
62/142, 143, 144, 146, 148, 476, 239

[56] References Cited

U.S. PATENT DOCUMENTS

| 1,015,145 | 1/1912 | Davis | 62/148 |
| 2,068,333 | 1/1937 | Krummell | 62/148 |
| 2,287,172 | 6/1942 | Harrison et al. | 62/480 |
| 2,417,761 | 3/1947 | Erland Af Kleen | 62/144 |
| 2,528,004 | 10/1950 | Erland Af Kleen | 62/144 |
| 4,183,227 | 1/1980 | Bouvin et al. | 62/480 |

FOREIGN PATENT DOCUMENTS 139098 1/1987 Japan .

OTHER PUBLICATIONS

"A Study of Dual Zeolite-Water Absorption System for Automotive Air Conditioning" Internation Symposoum on Automotive Technology and Automation Jun. 5-1992.

Primary Examiner—Henry A. Bennett
Assistant Examiner—William C. Doerrler
Attorney, Agent, or Firm—Kenjiro Hidaka

[57] ABSTRACT

A dual-adsorber cooling system for an automobile has a pair of adsorbers, a cooling vessel, a pair of absorbate outgoing passages extending from the cooling vessel to each of the adsorbers individually, a common adsorbate return passage, a condenser, and a condensation passage. A bypass passage enables the two adsorbers to directly communicate each other to exchange heat. The adsorbers are opposingly disposed with an intervening plenum therebetween. The engine exhaust gas is introduced to the central plenum, and the external air is guided to the central plenum through the adsorbing adsorber so that a blend of the exhaust gas and the air is directed to the desorbing adsorber in the plenum, whereby the adsorbing adsorber is cooled and the desorbing adsorber is heated up. The amount of the external air taken can be controlled according to the amount of the exhaust gas. A process switchover controller can adjust the process cycle period according to the temperature of the exhaust gas. An air flow amount controller can control the amount of the external air taken according to the amount of available heat. The adsorbers may be heated by microwave energy.

6 Claims, 8 Drawing Sheets

| First Adsorber | | Valves | | | | | Second Adsorber | |
|---|---|---|---|---|---|---|---|---|
| Process | Phase | V1 | V3 | V5 | V4 | V2 | Phase | Process |
| Adsorption | C'→D | X | X | O | X | X | A'→B | Desorption |
| | D→A | O | X | O | O | X | B→C | |
| Intermediate | — | X | O | X | O | X | — | Intermediate |
| Desorption | A'→B | X | X | O | X | X | C'→D | Adsorption |
| | B→C | X | O | O | X | O | D→A | |
| Intermediate | — | X | O | X | O | X | — | Intermediate |

O : Open    X : Close

| First Adsorber | | Valves | | | | | Second Adsorber | |
|---|---|---|---|---|---|---|---|---|
| Process | Phase | V1 | V3' | V5 | V4' | V2 | Phase | Process |
| Adsorption | C' → D | X | X | X | O | X | A' → B | Desorption |
|  | D → A | O | X | O | O | X | B → C |  |
| Intermediate | — | X | O | X | O | X | — | Intermediate |
| Desorption | A' → B | X | O | X | X | X | C' → D | Adsorption |
|  | B → C | X | O | O | X | O | D → A |  |
| Intermediate | — | X | O | X | O | X | — | Intermediate |

O : Open    : Close

ADSORPTION COOLING SYSTEM

BACKGROUND OF THE INVENTION

1. Field of the Invention

The present invention relates to an adsorption cooling system used for air conditioning apparatus for automobiles, vessels, or residences, or in cooling apparatus of shipping containers for food products or medical products that require refrigeration.

2. Description of the Prior Art

Prior known cooling systems for such air conditioning apparatus and refrigeration apparatus include a well-known heat pump system and, more recently, an adsorption system which uses adsorbents such as zeolite.

The prior technology is exemplified by what is described in Japanese Laid-Open Patent Application 61-139098, filed Jun. 14, 1986, Laid-Open No. 62-5060, laid-open Jan. 12, 1987, priority being claimed on German Patent Application P3521484.8, filed Jun. 14, 1985.

Figure 15:
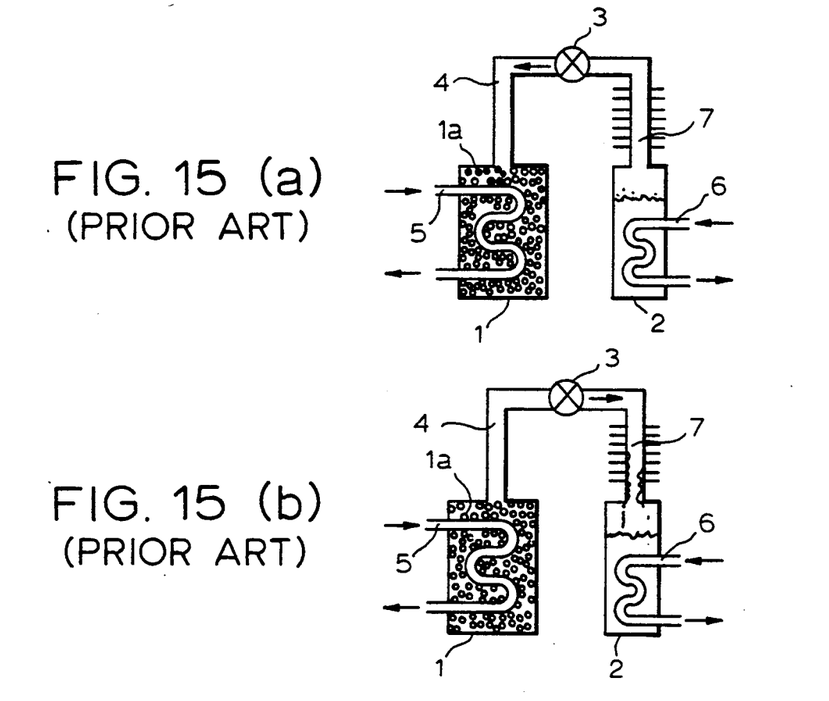
FIG. 15(a) and FIG. 15(b) illustrate a basic principle of a prior known single-adsorber type adsorption cooling system.

FIG. 15(a) and FIG. 15(b) illustrate a basic principle of a prior known single-adsorber type adsorption cooling system.

In FIG. 15(a), an adsorber 1 is connected with a cooling vessel 2 by a tubular passage 4 having a shutoff valve 3. The adsorber 1 houses adsorbent 1a such as zeolite, and a heat exchange pipe 5 which is in contact with the adsorbent 1a. The cooling vessel 2 contains water as an adsorption medium (adsorbate) which is in thermal contact with a cooling pipe 6. The air which is to be cooled is circulated through the cooling pipe 6. The adsorber 1, the cooling vessel 2 and the tubular passage 4 constitute a closed system which is evacuated of air. A condenser 7 for exchanging heat with the ambient air is provided on the tubular passage 4 near the cooling vessel 2.

With this cooling system, when the valve 3 is opened, the water inside the cooling vessel 2 evaporates into water vapor and flows through the tubular passage 4, in the direction shown by the arrow, into the adsorber 1 to be adsorbed by the adsorbent 1a by its adsorption action. Because of this, when 14 the water in the cooling vessel 2 evaporates, the latent heat is adsorbed in the cooling vessel 2, so that the temperature in the cooling vessel 2 declines so as to cool the air inside the cooling pipe 6. This operation is called an adsorption process.

Next is an operation whereby the water adsorbed by the adsorbent 1a is returned to the cooling vessel 2.

Referring now to FIG. 15(b), a high temperature gas from an external heat source is provided through the heat exchange pipe 5 to heat the adsorbent 1a and thereby desorb and separate the water adsorbed in it. Then, the separated water in a state of vapor is driven through the tubular passage 4, in the direction shown by the arrow, to the condenser 7, where the water vapor becomes liquid water and is recovered in the cooling vessel 2. This operation is called a desorption process.

The adsorption here means a state where the water molecules are retained among the molecules of the adsorbent. Reversely, in the desorption action, the water molecules are desorbed and separated from the molecules of the adsorbent as the adsorbent is heated.

However, the single-adsorber type adsorption cooling system described above is incapable of continuous cooling because the adsorption process and the desorption process must be done alternately in the same system. With this in mind, a dual-adsorber type adsorption cooling system as shown in FIG. 16 has been proposed.

Figure 16:
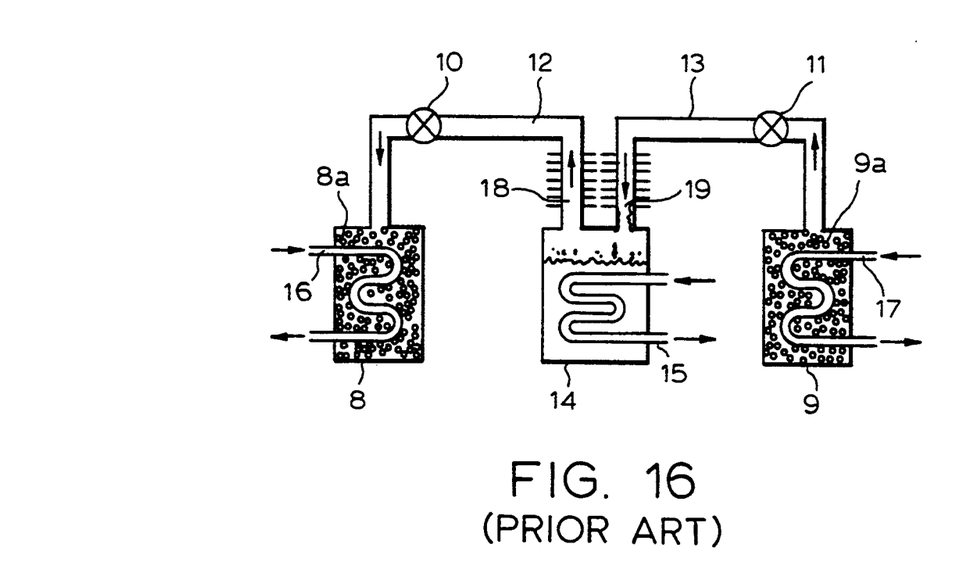
FIG. 16 illustrates a basic principle of a prior known dual-adsorber type adsorption cooling system.

In FIG. 16, two adsorbers 8, 9 are individually connected to a single cooling vessel 14 by tubes 12, 13, that respectively nave shutoff valves 10, 11. The water in the cooling vessel 14 is thermally contacted by a cooling pipe 15 in the same manner as in the case of the single-adsorber type adsorption cooling system described above. Adsorbents 8a, 9a in the adsorbers 8, 9 are also in thermal contact with heat exchange pipes 16, 17, respectively, and condensers 18, 19 are provided on the tubes 12, 13, respectively.

With this cooling system, while the adsorption process is performed at one adsorber, at, for example, the adsorber 8, the desorption process is simultaneously performed at the other adsorber 9. Then, the two adsorbers 8, 9 carry out a switching operation whereby they work in reverse when their respective processes have been completed. Since the adsorber 9 is at high temperature when the desorption operation has been completed, low or ambient temperature air is provided through the heat exchange pipe 17 to cool the adsorbent 9a. A continuous cooling in the cooling vessel 14 is thus made possible by periodically repeating such operation.

(Problems to be Resolved)

In the conventional dual-adsorber type adsorption cooling system described above, when the desorption process is completed in, for example, the adsorber 9, the tube 12 is at a low temperature and the tube 13 is at a high temperature. On the other hand, when the desorption process is completed in the adsorber 8, the tube 12 is at a high temperature and the tube 13 is at a low temperature. Because of this, there is a heat loss in the thermal capacities of the tubes 12, 13 each time when the adsorption-desorption processes are switched over. This heat loss leads to a problem of lowering the coefficient of performance (COP) of the system. Further, the adsorption heat (sensible heat) that is generated in the adsorber performing an adsorption process (adsorbing adsorber) becomes a waste heat. On the other hand, and at the same time, the adsorber performing a desorption process (desorbing adsorber) requires a large amount of thermal energy. This adverse heat requirement situation of the two adsorbers also causes to decrease the system COP.

In the conventional system, successive adsorption-desorption processes are alternated at a constant cycle period. But when automobile engine exhaust gas is utilized as a heating means, the amount of the heat actually varies with time. Therefore, unless the process switchover period is adjusted according to the amount of the available heat, an efficient operation of the system will not be expected and a desirable system COP will not be achieved.

In addition, zeolite, a widely used adsorbent material, will be decomposed and degenerated at a temperature exceeding 500° C., and the water adsorbed in zeolite will not be desorbed and separated at a temperature below 200° C. Therefore, an excessive variation of the available heat is an impediment in the operation of the system. Insufficient amount of available heat will necessitate an extended desorption time, thereby increasing the process cycle period and lowering the operation efficiency of the system.

SUMMARY OF THE INVENTION

The present invention was accomplished with a view to the above described problems.

An object of the present invention is to provide an adsorption cooling system capable of decreasing heat loss during each switching stage from one process to the next reversed process and thereby raising the COP of the system.

Another object of the present invention is to provide a compact and economical adsorption cooling system.

A further object of the present invention is to provide an adsorption cooling system wherein the adsorption heat (sensible neat) is effectively utilized and thereby its COP is increased.

A still another object of the present invention is to provide an adsorption cooling system wherein the heat in one adsorber which has completed a desorption process is utilized to heat up the other adsorber, thereby increasing the system COP.

A yet another object of the present invention is to provide a desorption cooling system wherein the process cycle period can be controlled in response to the amount of available heat.

A still further object of the present invention is to provide an adsorption cooling system wherein the desorbing adsorber can always be heated at about an even temperature.

An additional object of the present invention is to provide an adsorption cooling system wherein the time required for the desorption process is shortened, thereby further increasing the operation efficiency of the system.

In order to accomplish the above objects, the adsorption cooling system of the present invention has a pair of adsorbers, each containing adsorbent, a cooling vessel containing an adsorbate, a pair of adsorbate outgoing passages connecting the cooling vessel with each of the adsorbers individually, a cooling means and a heating means that alternatively cools and heats the adsorbers in parallel. The system has a single common adsorbate return passage, a single common condenser, and a condensation passage, through which the adsorbate returns from the desorbing adsorber to the cooling vessel. A bypass passage is provided so that the two adsorbers can directly communicate with each other for exchanging heat therethrough.

The adsorbers are disposed in an opposing arrangement with an intervening central plenum therebetween. An engine exhaust gas is introduced to the central plenum, and the external air is supplied to the central plenum through the adsorbing adsorber so that a blend of the exhaust gas and the air having passed through the adsorbing adsorber is directed to the desorbing adsorber, whereby the adsorbing adsorber is cooled by the air and the desorbing adsorber is heated by the blend of the air and the exhaust gas. The amount of the external air taken can be controlled according to the amount of the exhaust gas.

The system in another embodiment has a process switchover controller whereby the process cycle period can be adjusted according to the temperature of the exhaust gas.

The system in additional embodiment has an air flow amount controller whereby the amount of the external air taken can be controlled according to the amount of available heat.

In a further embodiment, the adsorbers are alternatively heated by microwave energy.

DESCRIPTION OF THE PREFERRED EMBODIMENTS

Figure 1:
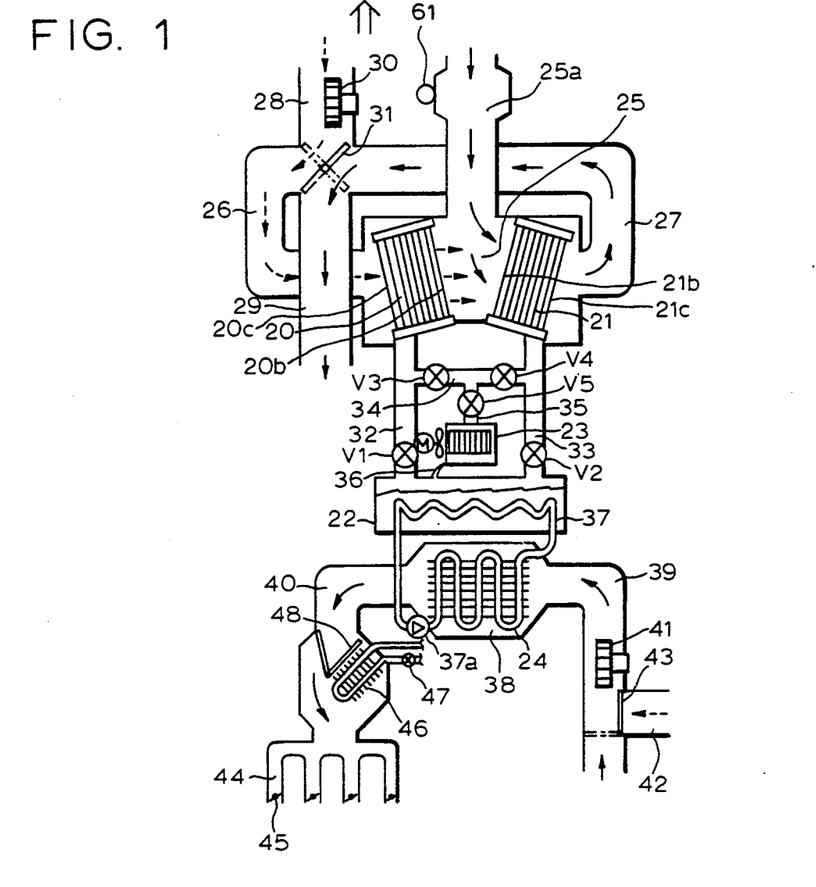
FIG. 1 is a block diagram representing a dual-adsorber type adsorption cooling system for an automobile according to the present invention.
Figure 2:
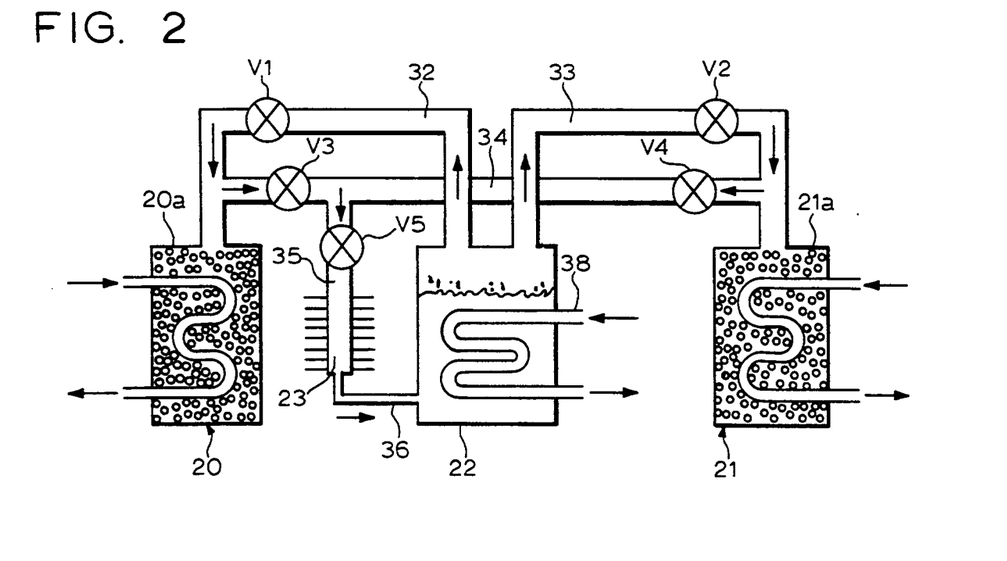
FIG. 2 is a block diagram, in a simplified form, of a substantial part of the dual-adsorber type adsorption cooling system of the present invention.

FIG. 1 is a block diagram representing a dual-adsorber type adsorption cooling system for an automobile according to the present invention and FIG. 2 is a block diagram, in a simplified form, of a substantial part of the dual-adsorber type adsorption cooling system.

In FIGS. 1 and 2, 20 and 21 are a first adsorber and a second adsorber, respectively, having adsorbents 20a and 21a (not shown), respectively, therein. (In FIG. 1, the first and the second adsorbers 20, 21 are shown in abbreviated detail.) Numeral 20b, 20c are a first side and a second side, respectively, of the first adsorber 20, and 21b, 21c are a first side and a second side, respectively, of the second adsorber 21. Numeral 22 is a cooling vessel that houses water as an adsorption medium (adsorbate), 23 is a condenser and 24 is a heat exchanger for the airconditioning of the vehicle compartment. Numeral 25 represents a central plenum, 25a an exhaust gas inlet passage, 26 a first intermediate passage, 27 a second intermediate passage, 28 an air inlet passage, and 29 an exhaust passage.

The exhaust gas inlet passage 25a communicates with the central plenum 25. The central plenum 25 communicates with the first intermediate passage 26 on one side through the first adsorber 20, and with the second intermediate passage 27 on the other side through the second adsorber 21.

Although not shown in detail, each of the first and the second adsorbers 20, 21 is actually constructed as a heat exchanger comprising a bundle of adsorber tubes brazed to a header at each end, and the adsorbent, such as zeolite, is housed in the adsorber tubes, so that air or gas can pass through the adsorbers 20, 21 for an efficient heat exchange. The first adsorber 20 and the second adsorber 21 are disposed with the central plenum 25 intervening therebetween and the central plenum 25 faces the exhaust gas inlet passage 25a which is connected to the exhaust outlet of the vehicle engine (not shown). The first and the second adsorbers 20, 21 are arranged such that their first sides 20b, 21b oppose each other and both the fist sides 20b, 21b also face the exhaust gas inlet passage 25a at an angle, as shown in FIG. 1. The second sides 20c, 21c of the first and the second adsorbers 20, 21 face the ends of the first intermediate passage 26 and the second intermediate passage 27, respectively. Other ends of the first and the second intermediate passages 26, 27 meet each other at a four-way intersection where the air inlet passage 28 and the exhaust passage 29 also meet. The other end of the air inlet passage 28 is open to the advancing direction of the vehicle (indicated in the double-lined arrow in FIG. 1), while the other end of the exhaust passage 29 opens in the opposite direction, so that the air supply and the exhaust may be accomplished effectively. A blower 30 for forced air supply is provided inside the air inlet passage 28. Further, a switching flap 31 is provided at the foursway intersection. When the switching flap 31 is set to the position shown by solid lines in FIG. 1, the first intermediate passage 26 communicates with the air inlet passage 28 and the second intermediate passage 27 communicates with the exhaust passage 29, and when the flap 31 is set to the other position (shown by broken lines), the first intermediate passage 26 communicates with the exhaust passage 29 and the second intermediate passage 27 communicates with the air inlet passage 28.

A first adsorbate outgoing passage 32 is provided between the first adsorber 20 and the cooling vessel 22 and a second adsorbate outgoing passage 33 is provided between the second adsorber 21 and the cooling vessel 22, so that the cooling vessel 22 can communicates with the first adsorber 20 via the first adsorbate outgoing passage 32 and with the second adsorber 21 via the second adsorbate outgoing passage 33. The first and the second adsorbate outgoing passages 32, 33 are provided with shutoff valves V1 and V2, respectively. Although the present example uses water as the adsorption medium (adsorbate) housed in the cooling vessel 22, it is also possible to use other adsorption media such as alcohol or other liquids. A bypass passage 34, having shutoff valves V3, V4, is provided between the first and the second adsorbers 20 and 21 so that the first and the second adsorbers 20 and 21 can communicate with each other directly via the bypass passage 34 when the valves V3, V4 are opened. An adsorbate return passage 35, having a shutoff valve V5, is provided between the bypass passage 34 and the condenser 23. One end of the adsorbate return passage 35 is connected to the bypass passage 34 between the valve V3 and the valve V4, so that the condenser 23 and the bypass passage 34 between the shutoff vales V3 and V4 communicate with each other when the valve 5 is opened. The bypass passage 34 can be regarded as a part of the adsorbate return passage 35 in terms of function. The condenser 23 is also connected with the cooling vessel 22 via a small-diameter condensation passage 36. The cross sectional area of flow in each passage is set so that the sectional areas of flow of the bypass passage 34 and the adsorbate return passage 35 are about 50% of the sectional area of flow of the first and the second adsorbate outgoing passages 32, 33, and the sectional area of flow of the condensation passage 36 is about 0.6% of the sectional area of flow of the bypass passage 34 and the adsorbate return passage 35.

The heat exchanger 24 is connected to a cooling pipe 37 which is in thermal contact with the water inside the cooling vessel 22 so that a thermal medium such as water or brine is made to circulate through the cooling pipe 37 between the cooling vessel 22 and the heat exchanger 24 by means of a pump 37a provided in the cooling pipe 37. The heat exchanger 24 is placed in a heat exchange chamber 38 which communicates with a vehicle room air intake blower passage 39 at one end and an exhaust blower passage 40 at the other end in a construction that is known in an automobile air conditioning apparatus as described next.

That is, a blower 41 is provided in the intake blower passage 39 while an external air intake 42 branches off the intake blower passage 39 with a flap 43 so that the inlet of the air intake blower passage 39 can be switched to the external air intake 42 by turning the flap 43 to the position shown by broken lines. The exhaust blower passage 40 branches into plural exhaust openings 44 which are provided at places in the vehicle compartment such as on or under the dashboard. A louver 45 is provided in each exhaust opening 44. A heating pipe 46, which is connected to the engine radiator (not shown), is provided in the exhaust blower passage 40 and is used for the purpose of heating or demoisturizing of the air in the vehicle compartment, if and when the air in the compartment should be heated rather than cooled. The heating pipe 46 has a shutoff valve 47. By opening the valve 47, the heated engine radiator coolant circulates through the heating pipe 46 so as to heat the air in the exhaust air passage 40. A deflector flap 48 is provided in the exhaust blower passage 40 on the upstream side of the heating pipe 46, so that the amount of the air passing through the heating pipe 46 can be regulated by setting the deflector flap 48 to a proper position.

In the construction described above, when, for example, the adsorption process is performed at the first adsorber 20 and the desorption process at the second adsorber 21, the switching flap 31 is set to the position illustrated by solid lines. Then, while the high temperature exhaust gas is supplied from the exhaust gas intake passage 25a into the central plenum 25 between the first and the second adsorbers 20 and 21, the external low temperature air entering from the external air intake passage 28 is supplied to the first adsorber 20 via the first intermediate passage 26 as shown by the broken line arrows. The air passes through the first adsorber 20 from its second side 20a to the first side 20b and advances toward the opposing second adsorber 21 in the central plenum 25, while confluxing with the high temperature exhaust gas having entered from the exhaust gas intake passage 25a. Therefore, the flow of the high temperature exhaust gas is deflected toward the second adsorber 21 by the air having entered the central plenum through the first adsorber 20, and, therefore, a blend of the high temperature exhaust gas and the air passes through the second adsorber 21 from its first side 21b to the second side 21c, thereby heating the second adsorber 21. The blend of the gas and the air having passed the second adsorber 21 is exhausted externally via the second intermediate passage 27 and the exhaust passage 29, as illustrated by solid line arrows.

Since the first side 21b of the second adsorber 21 is facing the exhaust gas intake passage 25a at an angle, the high temperature exhaust gas from the exhaust gas intake passage 25a smoothly enters the second adsorber 21.

On the other hand, the low temperature air supplied to the first adsorber 20 cools the first adsorber 20 and picks up an adsorbing heat (sensible heat) from the first adsorber 20 while passing therethrough. Thus, the adsorption heat generated in the first adsorber 20 is taken by the air from the first adsorber 20 and is utilized to heat the second adsorber 21. This is a utilization of otherwise waste heat and, therefore, it substantially contributes to the increase of the system COP.

The heating efficiency of the second adsorber 21 decreases as the flow velocity of the gas passing the second adsorber 21 decreases. On the other hand, since the amount of the exhaust gas entering from the exhaust gas intake passage 25a varies depending on the running conditions of the vehicle engine, such as its revolution speed, the total amount of the blend of the exhaust gas and the air passing through the second adsorber 21 is controlled by a control apparatus that is not illustrated. That is, when the amount of the gas in the exhaust gas intake passage 25a decreases, the revolution speed of the blower 30 is increased to increase the amount of the air in the air intake passage 28 and keep the total amount of the air and the exhaust gas passing through the second adsorber approximately constant.

When the processes of the first and the second adsorbers 20, 21 are the reverse of what has been described, the first adsorber 20 will be heated and the second adsorber 21 will be cooled by setting the switching flap 31 to the position illustrated by broken lines. At that time, the flow directions of the air or the blend of the air and the exhaust gas in both the first intermediate passage 26 and the second intermediate passage #27 will be opposite to the directions indicated by the broken line arrows and the solid line arrows, respectively.

Next, the operation of the adsorption cooling system of the present invention, particularly the functions of the first adsorber 20, the second adsorber 21 and the cooling vessel 22, will be explained in reference to FIGS. 2 and 3. Parts of the construction shown in FIG. 2 are illustrated in different forms from the forms shown in FIG. 1 for ease of explanation.

Figure 3:
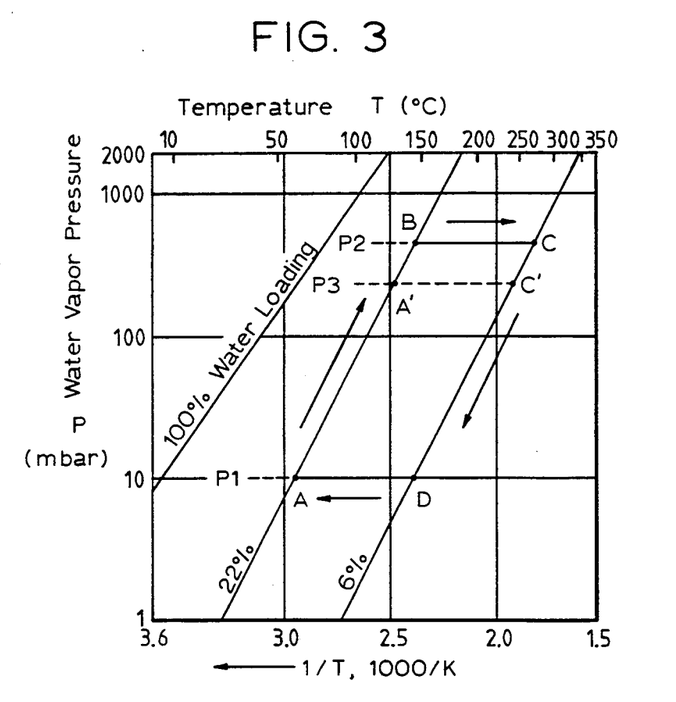
FIG. 3 shows an idealized adsorption-desorption cycle on a P-1/T diagram.

FIG. 3 shows an idealized adsorption-desorption cycle on a P-1/T diagram for an example of the vapor pressures and the vapor temperatures inside the adsorbers. The numeric values described below and shown in FIG. 3 are for explanation purposes.

Referring to FIGS. 2 and 3, when the adsorption process is to be performed in the first adsorber 20 and the desorption process in the second adsorber 21, firstly the valves V1, V2, V3 and V4 are closed and the valve V5 is opened. By these means, the temperature inside the first adsorber 20 is cooled to 150° C. on the water isostere for a water loading of 6% (phase C' to D in FIG. 3), and the temperature inside the second adsorber 21 is heated to 150° C. on the water isostere for a water loading of 22% (phase A' to B). At this time, vapor pressure P1 inside the first adsorber 22 becomes 10 mbar, and the vapor pressure P2 inside the second adsorber 21 becomes 450 mbar. P3 is the mean value of P1 and P2. Next, the valves V1, V4 and V5 are opened, while the valves V2 and V3 are kept closed. By these means, the water inside the cooling vessel 22 evaporates under the pressure of 10 mbar, flows to the first adsorber 21 via the first adsorbate outgoing passage 32, and is adsorbed by the adsorbent 20a in the first adsorber 20. At this time, the heat inside the cooling vessel 22 is lost because of the latent heat of evaporation of the water. Then, by keeping cooling the inside of the first adsorber 20, the water inside the cooling vessel 22 continuously evaporates and is adsorbed by the adsorbent 20a, and the inside of the first adsorber 20 is ultimately cooled to 70° C. (phase D to A). On the other hand, the inside of the second adsorber 21 is heated to 280° C. under the pressure of 450 mbar (phase B to C), and the water adsorbed in the adsorbent 21a of the second adsorber 21 is now desorbed and separated from the adsorbent 21a in a vapor state and flows through the bypass passage 34 and the adsorbate return passage 35 into the condenser 23. Then, the water vapor is condensed in the condenser 23 into liquid water, passes through the condensation passage 36 and returns to the cooling vessel 22. This operation occurs in periods of one minute to one day.

The reason for the sectional areas of flow in the first and the second adsorbate outgoing passages 32, 33, the adsorbate return passage 35 and the condensation passage 36 being made successively smaller is that the density of the vapor increases in that sequence (it is in the state of liquid in the condensation passage 36). It is particularly desirable that the quantity of the water passing in the condensation passage 36 is nearly equivalent to the quantity of the vapor evaporating out from the cooling vessel 22.

At the point in time when the above processes are completed, the inside of the second adsorber 21 where the desorption process occurred has reached a high temperature of about 280° C., and the inside of the first adsorber 20 where the adsorption process was completed has reached a low temperature of about 70° C. Before the first and the second adsorbers 20, 21 are switched to the processes opposite to those just described, the difference in enthalpy (heat content) between the first adsorber 20 and the second adsorber 21 is utilized in order not to waste the heat by means of an intermediate process, which will be described next.

That is, only the valves V3, V4 in the bypass passage 34 are now opened while the valves V1, V2, V5 are closed so that the first adsorber 20 and the second adsorber 21 are directly communicated with each other through the bypass passage 34 without involving the cooling vessel 22 therebetween. By these means, a portion of the heat in the second adsorber 21 shifts into the first adsorber 20, so that the temperature in the first adsorber 20 in which the desorption process will next be carried out is increased while the temperature inside the second adsorber 21 in which the adsorption process will next be carried out is decreased. Thus, the difference in enthalpy between the first adsorber 20 and the second adsorber 21 is kept from becoming a waste heat and is utilized to boost the COP of the system. This intermediate process is done only on the order of 1% to 5% of the time required for completing the above described adsorption-desorption processes. Although the intermediate process cannot be plotted in the diagram in FIG. 3, it may be considered to be a portion of the adsorption-desorption processes.

Thus, the inside of the cooling vessel 22 is continuously cooled by periodically repeating the process cycle of adsorption/desorption-intermediate-desorption/adsorption-intermediate- . . . in the first and the second adsorbers 20, 21 alternatively and in parallel.

Figure 4:
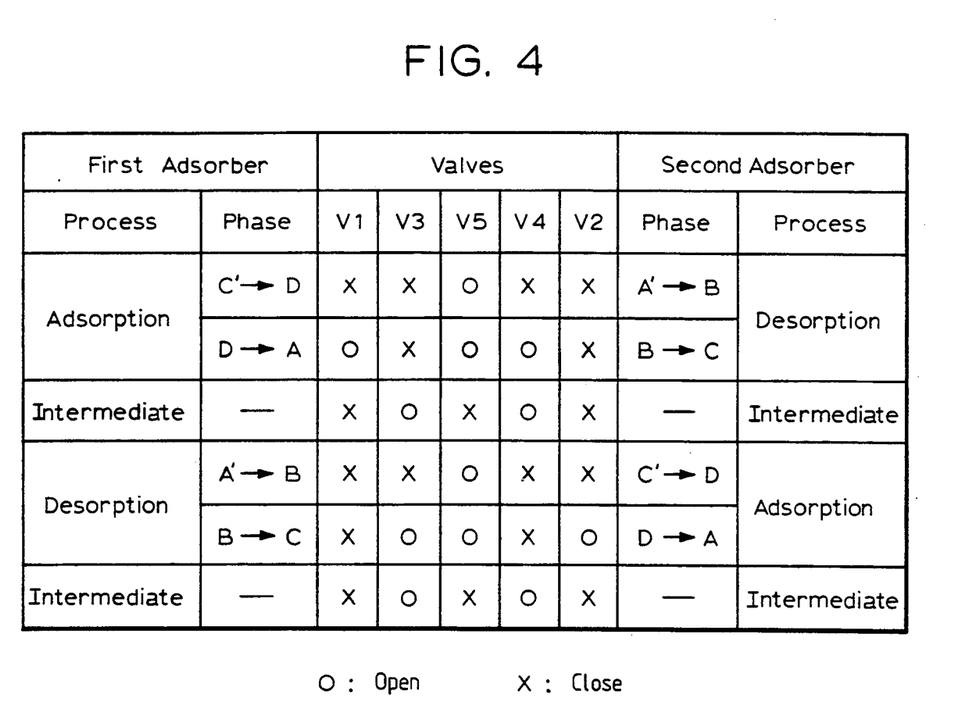
FIG. 4 is a table showing the open-close states of five different shutoff valves used in the dual-adsorber type adsorption cooling system of the present invention.

FIG. 4 shows the opensclose states of the shutoff valves V1, V2, V3, V4 and V5 for a complete cycle of the above described processes.

The adsorption cooling system of the above example according to the present invention decreases heat loss between the cooling vessel 22 and each of the first and the second adsorbers 20, 21 at times when the processes in the first and the second adsorbers 20, 21 are being switched over from adsorption process to desorption process or from desorption process to adsorption process, and thus makes it possible to have a marked improvement in the COP (coefficient of performance) of the system.

Furthermore, there is no need to furnish one condenser for each of the first and the second adsorbers 20, 21 because the adsorbate return passage 35 branches off from the bypass passage 34 to give a common connection to the single condenser 23 which is connected to the cooling vessel 22 by way of the condensation passage 36. This construction contributes to a cost reduction.

In addition, the sizes of the bypass passage 34, adsorbate return passage 35 and the condenser passage 36 are decreased to the minimum required because the sectional area of flow in the bypass passage 34 and the adsorbate return passage 35 is made smaller than that of the first and the second adsorbate outgoing passages 32, 33 while the sectional area of flow in the condenser passage 36 is made much smaller than that of the bypass passage 34 and the adsorbate return passage 35. This makes it possible to realize a compact system overall.

Figure 5:
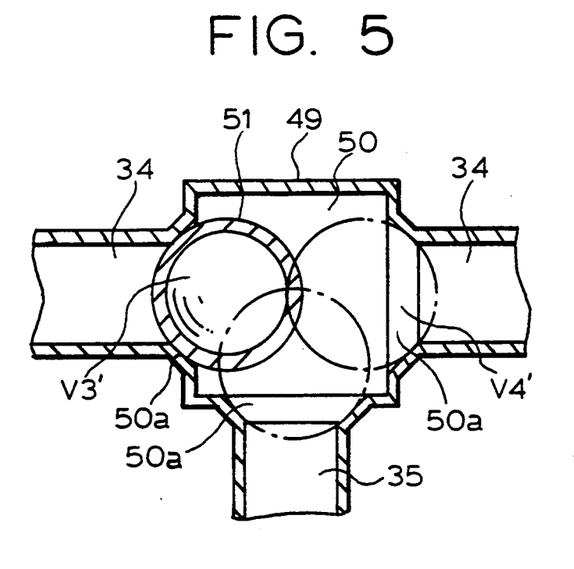
FIGS. 5 and 6 show a section of a three-way valve unit used for the second embodiment of the adsorption cooling system of the present invention.
Figure 6:
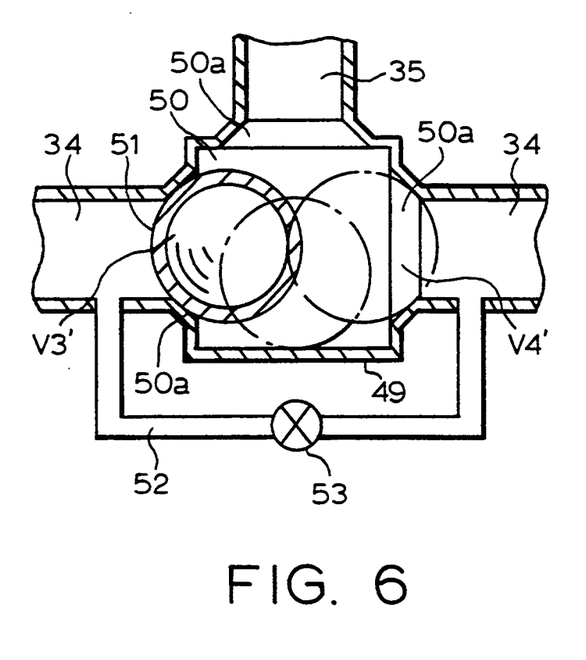

Now, the second embodiment of the adsorption cooling system of the present invention will be explained in reference to FIGS. 1, 5, 6 and 7. FIGS. 5 and 6 show a section of a three-way valve unit used for the second embodiment.

Referring to FIGS. 1, 5 and 6, a three-way valve unit 49 is installed in the bypass passage 34 at the branch point of the adsorbate return passage 35. The valve unit 49 has a valve chest 50 therein, in which a light-weight spherical hollow valve body 51, made of fluorine or silicon based rubber, is accommodated.

The valve chest 50 has openings on its three sides, one to a part of the bypass passage 34 communicating with the first adsorber 20, another to the other part of the bypass passage 34 communicating with the second adsorber 21, and the other to the adsorbate return passage 35. In the arrangement shown in FIG. 5, the adsorbate return passage 35 directs vertically downwardly from the valve chest 50. At the periphery of each of the three openings is formed a valve seat 50a to which the valve body 51 can sealingly fit.

The valve body 51 is freely movable in the chest 50 to any of the three valve seats 50a. The two valve seats 50a on the left-hand side and the right-hand side (as vied in FIG. 5) and the valve body 51 jointly and respectively function for the above described valves V3 and V4 (FIGS. 1, 2) of the bypass passage 34, and the corresponding valve functions by the valve unit 49 are named V3' and V4', respectively, for explanation purposes.

When a difference in pressure exists in the bypass passage 34 between the two parts thereof on the opposite sides of the valve chest 50, the valve body 51 moves toward the valve seat 50a on the lower pressure side and closes the opening on that side. The lower pressure side is the side where the bypass passage 34 communicates with the adsorber in the adsorbing process and the higher pressure side is the side where the bypass passage 34 communicates with the adsorber in the desorbing process. In other words, the valve unit 49 by itself always closes the bypass passage 34 so as to cut off the communication between the chest 50 and the adsorbing adsorber while opening the communication between the chest 50 and the desorbing adsorber.

In FIG. 5, it is assumed that the left-hand side (as viewed in FIG. 5) is the side of the adsorption process and, therefore, the valve body 51 stays to the left-hand side in the valve chest 50 to close the part of the bypass passage 34 on the left-hand side (V3' closed). At this time, the part of the bypass passage 34 on the desorption side (right-hand side in FIG. 5) and the adsorbate return passage 35 are communicated with each other. This state corresponds to the phase "D to A" or phase "B to C" on the P-1/T diagram in FIG. 3. As one adsorption-desorption process comes close to the completion, the pressure difference between the two opposite parts of the bypass passage 34 decreases, and when the valve V5 (Not shown in FIG. 5. Refer to FIG. 1) of the adsorbate return passage 35 is closed, the valve body 51 drops to the bottom valve seat 50a of the adsorbate return passage 35 because of the decreased pressure difference and the shock from the closure of the valve V5. This results in an opening of the bypass passage 34 throughout (both V3', V4' open) This state corresponds to the intermediate process described before.

When the succeeding parallel desorption-adsorption process starts, the pressure difference in the bypass passage 34 is reversed from the one just described. Then, the valve body 51 moves to the valve seat 50a on the side opposite to the one just described (i.e. right-hand side in FIG. 5; V4' closed).

FIG. 6 shows an alternative embodiment of the bypass passage 34 in association with the function of the valve unit 49.

In FIG. 6, a valve bypass passage 52, having a shutoff valve 53, is provided across the two opposite parts of the bypass passage 34 so that the bypass passage 34 can bypass the valve unit 49 through the valve bypass passage 53. In this construction, the valve 53 is kept closed when the valve body 51 is on either of the two valve seats 50a on the sides. And the valve 53 is simultaneously opened when the valve V5 (Not shown in FIG. 6. Refer to FIG. 1) is closed as a link motion so that both the opposite parts of the bypass passage 34 are directly communicated with each other without going through the valve chest 50. Then, the pressures in the two opposite parts of the bypass passage 34 tend to be equalized and the valve body 51 drops to the neutral position in the valve chest 50 (all V3', V4', V5' open) thereby opening the bypass passage 34 throughout. Since the adsorbate return passage 35 is closed by the valve V5 when the bypass passage 34 is opened throughout, the valve body 51 itself need not necessarily close the adsorbate return passage 35. Therefore, the valve unit 49 may be installed in an inverted arrangement of that shown in FIG. 5. FIG. 6 shows such an inverted arrangement of the valve unit 49.

Figure 7:
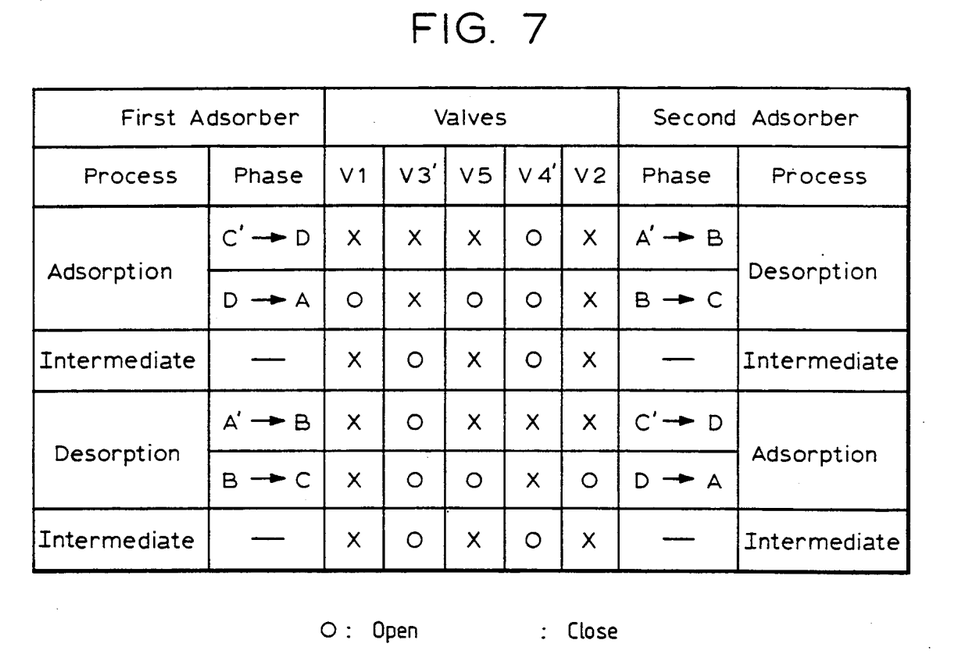
FIG. 7, is a table showing the open-close states of the valves used in the second embodiment of the adsorption cooling system.

FIG. 7, shows the open-close states of the valve unit 49 (V3', V4') and the other three valves (V1, V2, V5 shown in FIGS. 1, 2), which are applicable to this second embodiment.

The valves V3, V4 of the first embodiment (FIG. 1) in the bypass passage 34 can naturally be eliminated by the adoption of the valve unit 49, This contributes to a reduction of the cost and the size of the system.

Figure 8:
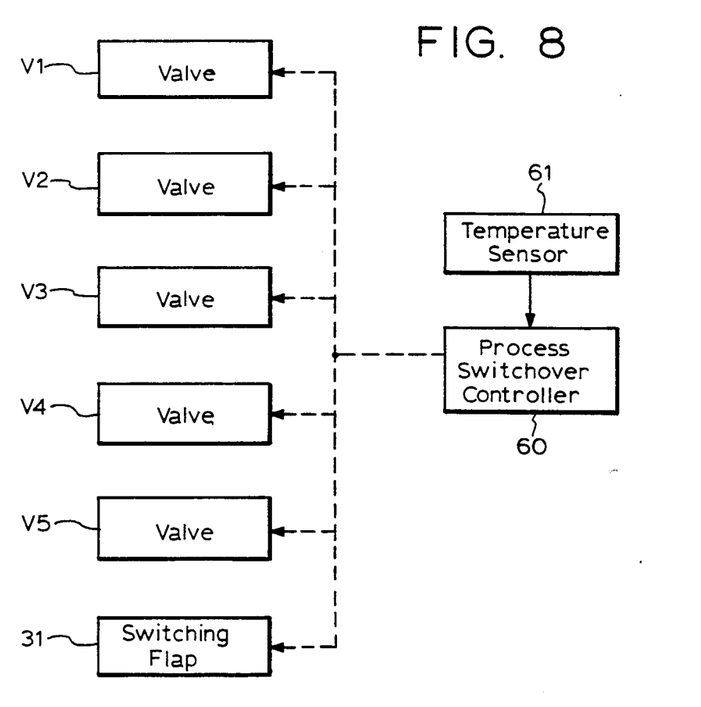
FIG. 8 is a connection diagram for a process switchover controller used in the third embodiment of the adsorption cooling system.
Figure 9:
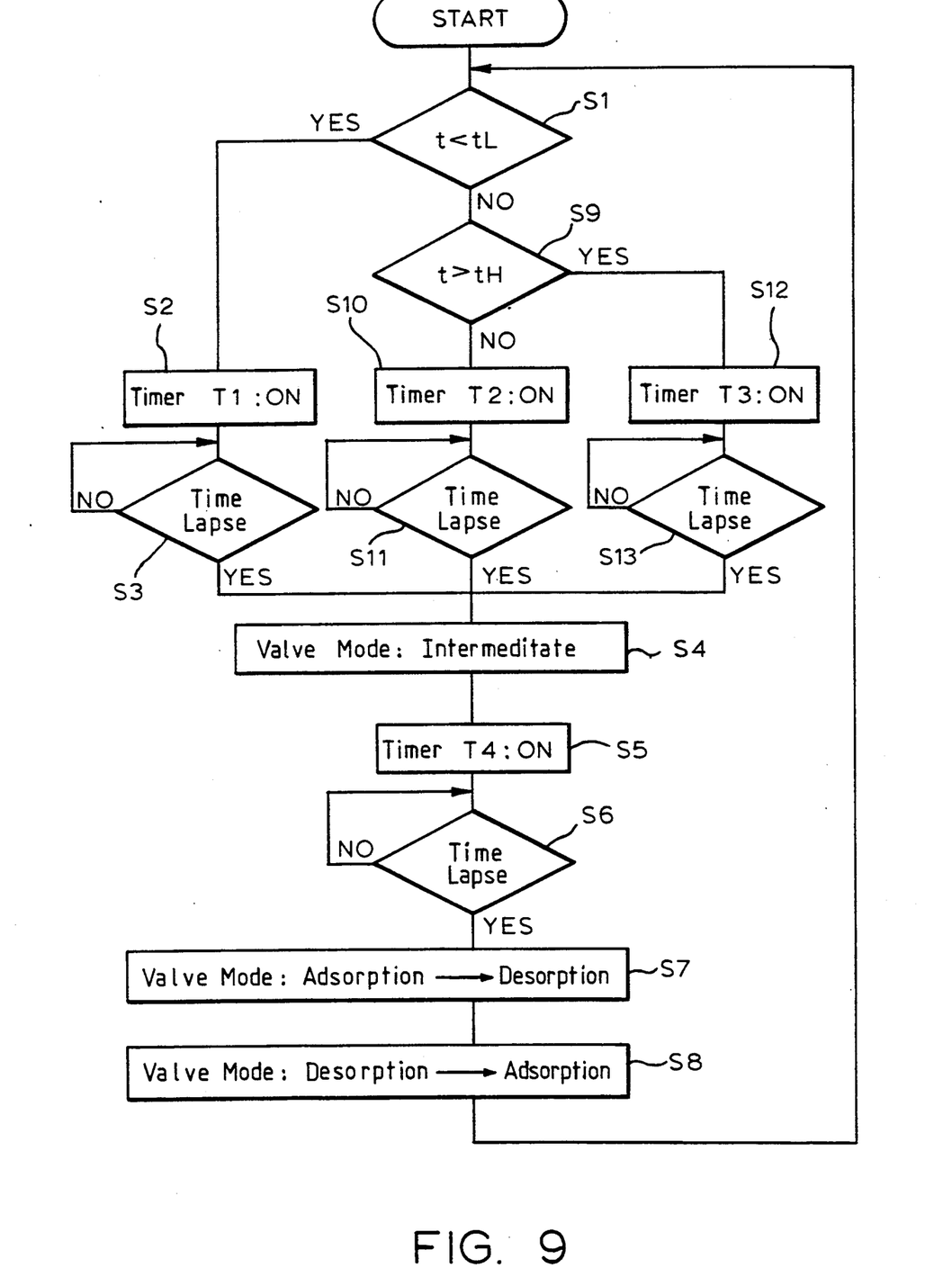
FIG. 9 is a flowchart showing the function of the process switchover controller of the third embodiment.

Next, the third embodiment of the adsorption cooling system of the present invention will be explained in reference to FIGS. 1, 4, 8 and 9. FIG. 8 is a connection diagram for a process switchover controller 60 used in the third embodiment. FIG. 9 is a flowchart showing the function of the process switchover controller 60. In FIG. 1, numeral 61 denotes a temperature sensor which picks up the temperature of the exhaust gas in the exhaust gas inlet passage 25a.

In the third embodiment, the switchover time period of an adsorption-desorption process to the succeeding desorption-adsorption process is controlled by the process switchover controller 60 according to the amount of the heat of the exhaust gas being taken through the exhaust gas inlet passage 25a. This operation is performed because the amount of heat of the exhaust gas varies depending on the running condition of the engine such as its revolution speed.

Referring to FIG. 9, when each process has been switched over, if, for example, the temperature t picked up by the temperature sensor 61 is judged to be lower than a predetermined minimum value tL (S1), a timer T1 is turned on (S2) and is set for a predetermined longest time period of each process step. After the set time period of the timer T1 has elapsed (A3), the valve mode is set to its intermediate process mode (S4) (See FIG. 4), and a timer T4 set for the intermediate process time is turned on (S5). When the set time period of the timer T4 has elapsed (S6), the valve mode is changed over to the next adsorption-desorption process so that the adsorbers 20, 21 having completed an adsorption or desorption process are respectively reversed to a desorption or adsorption process (S7, S8), and the sequence returns to the first step S1.

If the temperature t picked up by the temperature sensor 61 is judged to be higher than the predetermined minimum value tL (S1) and lower than a predetermined maximum value tH (S9), a timer T2 is turned on (S10). The timer T2 is set for a standard time period for each of the processes. After the standard time period timed by the timer T2 has elapsed (S11), then, the steps S4 to S8 are performed, in the same sequence as already explained above, and the sequence returns to the first step S1.

If, for example, the temperature t picked up by the temperature sensor 61 is judged to be higher than not only the predetermined minimum value tL (S1) but also the predetermined maximum value tH (S9), a timer T3 is turned on (S12). The timer T3 is set for a shortest time period for each of the processes. After the shortest time period timed by the timer T3 has elapsed (S13), the steps S4 to S8 are performed, in the same sequence as explained above, and the sequence returns to the first step S1.

The time period for the adsorption and desorption processes is made long when the temperature in the exhaust gas inlet passage 25a is low, and it is made short when the temperature is high. Thus, when the amount of heat available for a desorption process is small, the desorption process is performed for a long time, and, inversely, when the available amount of heat is large, the desorption process is performed for a shorter time. This results in a saving of time, enhancement of the cooling capability, and increase of the system COP, even if the amount of heat of the exhaust gas varies.

In the above embodiment, the amount of the heat in the exhaust gas inlet passage 25a is determined by picking up the temperature t by the temperature sensor 61. Alternatively, the amount of the heat of the exhaust gas may be calculated according to the revolution speed of the engine or the driving speed of the vehicle.

Figure 10:
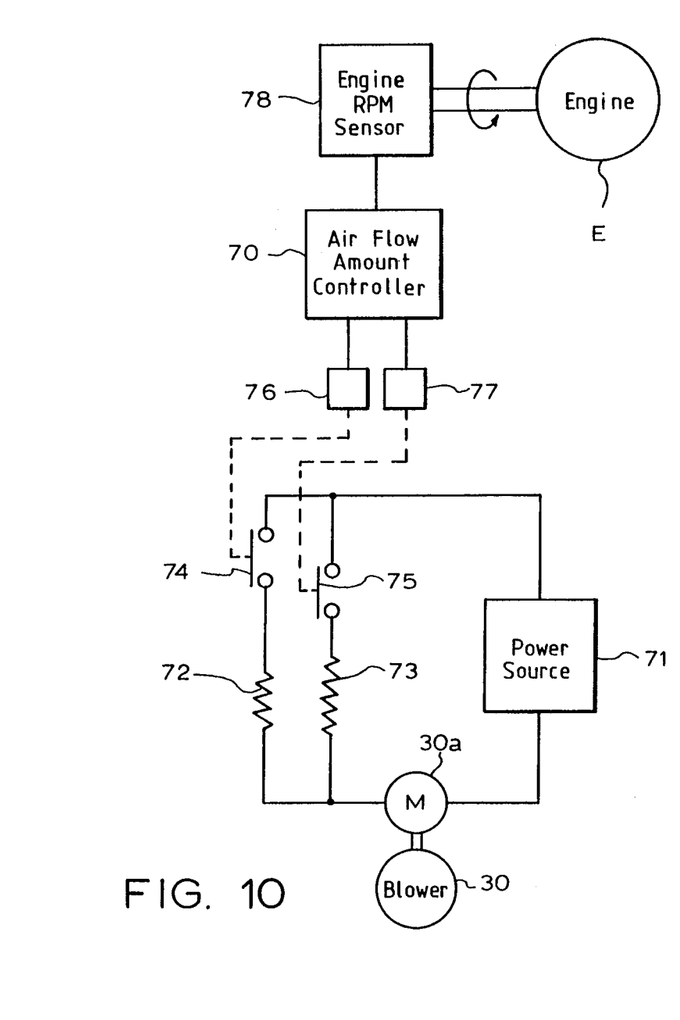
FIG. 10 shows a connection diagram of an air flow amount controller system used for the fourth embodiment of the adsorption cooling system of the present invention.
Figure 11:
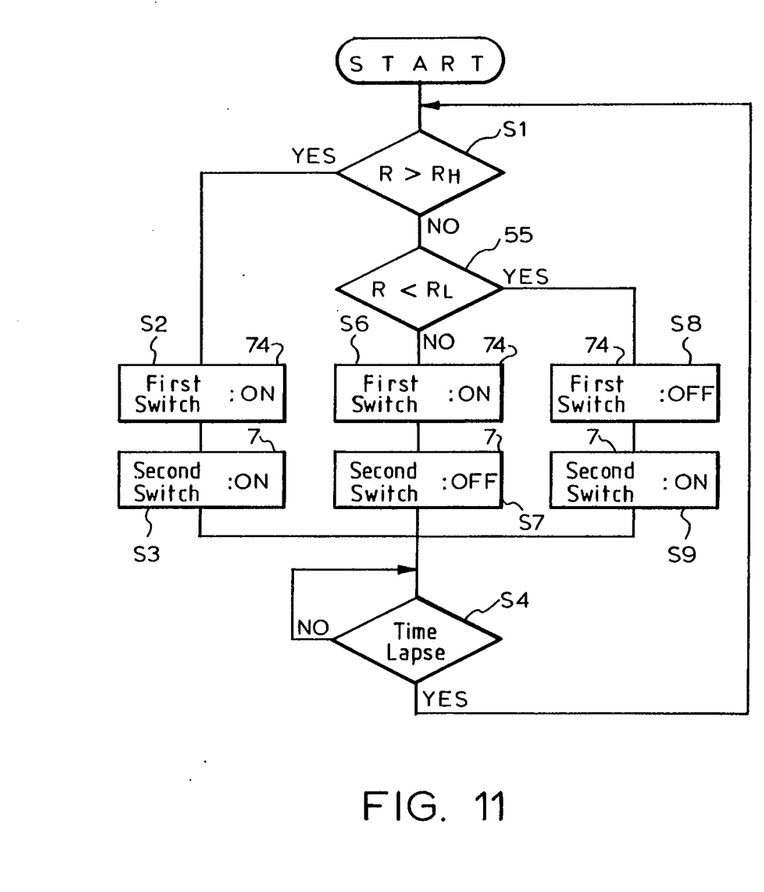
FIG. 11 is a flowchart showing the function of the air flow amount controller system of the fourth embodiment.

Now, the fourth embodiment of the cooling system of the present invention will be explained in reference to FIGS. 1, 10, 11, 12 and 13. FIG. 10 shows a connection diagram of an air flow amount controller system used for the fourth embodiment, and FIG. 11 is a flowchart of the air flow amount controller system.

In reference to FIGS. 1 and 10, an air flow amount controller 70 (FIG. 10), including a micro computer (not shown), is provided to regulate the speed of a motor 30a which drives the blower 30 in the air inlet passage 28 (FIG. 1) As shown in FIG. 10, one terminal of the motor 30a is electrically connected to a power source 71 and the other terminal is connected to a first resistor 72 and a second resistor 73 in parallel. Between the other ends of the first and the second resistors 72 and 73 and the power source 71 are connected a first on-off relay switch 74 and the second on-off relay switch 75, respectively. The resistance of the resistor 72 is smaller than that of the resistor 73. The first and the second relay on-off switches 74 and 75 are operated by a first relay 76 and a second relay 77, respectively, which are electrically connected to the air flow amount controller 70.

On the other hand, an engine RPM sensor 78 is connected to the vehicle engine E, whose exhaust gas heats the first and the second adsorbers 20, 21 alternatively as described before, in order to pick up the revolution speed of the engine E. The RPM sensor 78 is also electrically connected to the air flow amount controller 70. The air flow amount controller 70 is preset with a high revolution speed RH and a low revolution speed RL, and the range between the high revolution speed RH and the low revolution speed RL is the standard revolution speed range.

The revolution speed of the blower 30 is controlled by the air flow amount controller 70 according to the amount of the heat of the engine exhaust gas entering through the exhaust gas inlet passage 25a which is estimated by the air flow amount controller 70 from the running condition of the engine such as its RPM.

The detail function of the air flow amount controller 70 will now be explained in reference to FIG. 10 and the flowchart of FIG. 11.

If the value R picked up by the engine RPM sensor 78 is judged by the air flow amount controller 70 to be greater than the preset high revolution speed RH (Step S1), both the first switch 74 and the second switch 75 are turned on (S2, S3). Then, the motor 30a of the blower 30 is powered through both the first resistor 72 and the second resistor 73. Since the total resistance of the first and the second resistors 72, 73, connected with each other in parallel, is even smaller than the resistance of the first resistor 72, whose resistance is smaller than that of the resistor 73, the motor 30a is driven at a high speed and the air flow amount in the air inlet passage 28 is maintained at a high level. After a time has lapsed (S4), the sequence reverts to the initial step S1.

If the value R picked up by the engine RPM sensor 78 is judged by the air flow amount controller 70 to be smaller than the preset high revolution speed RH (S1)

but greater than the preset low revolution speed RL (S5), the first switch 74 is turned on (S6) and the second switch 75 is turned off (S7). Then, the motor 30a of the blower 30 is powered through only the first resistor 72. Since the resistance value of the first resistor 72 is between that of the total of the first and the second resistors 72, 73, connected in parallel with each other, and that of the second resister 73, the motor 30a is driven at an intermediate speed, and the air flow amount in the air inlet passage 28 is also maintained at an intermediate level. After a time has lapsed (S4), the sequence reverts to the initial step S1.

If the value R picked up by the engine RPM sensor 78 is judged by the air flow amount controller 70 to be smaller than not only the preset high revolution speed RH (S1) but also the low revolution speed RL (S5), the first switch 74 is turned off (S8) and the second switch 75 is turned on (S9). Then, the motor 30a of the blower 30 is powered through only the second resistor 73. Since the resistance value of the second resistor 73 is greater than that of the first resistor 72, the motor 30a is driven at a low speed and the air flow amount in the air inlet passage 28 is maintained at a low level. After a time has lapsed (S4), the sequence reverts to the initial step S1.

In this fourth embodiment, the amount of available heat to heat up the adsorbers 20, 21 for desorption is judged according to the engine revolution speed picked up by the engine RPM sensor 78, and the amount of the air taken from the air inlet passage 28 is increased when the amount of available heat is large, and, inversely, the amount of the air is decreased when the amount of available heat is small. Thus, the heating temperature of the adsorbers 20, 21 can be maintained at an approximately equal level even if the amount of the heat of the exhaust gas varies.

Alternatively, the amount of the air may be controlled according to the driving speed of the vehicle instead of the revolution speed of the engine.

Figures 12, 13:
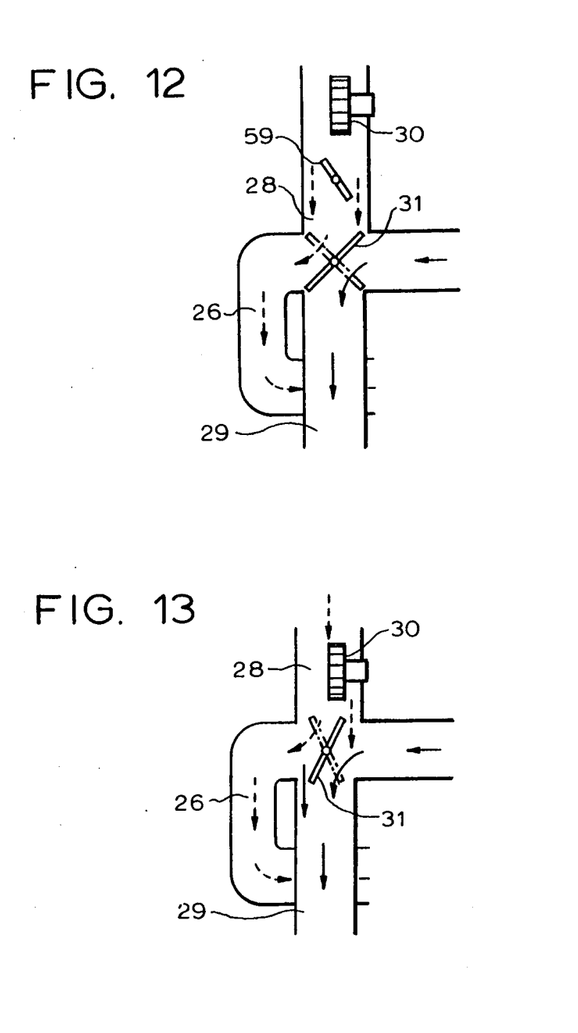
FIGS. 12 and 13 show alternative methods of controlling the air flow amount in the fourth embodiment.

FIGS. 12 and 13 show an alternative method of controlling the amount of the air intake. In FIG. 12, an air flow control damper 59 is installed in the air inlet passage 28. In FIG. 13, the flap 31 is set at a proper angle so that a portion of the air from the air inlet passage 28 is allowed to pass to the exhaust passage 29, so that the amount of the air entering the first intermediate passage 26 is controlled.

Figure 14:
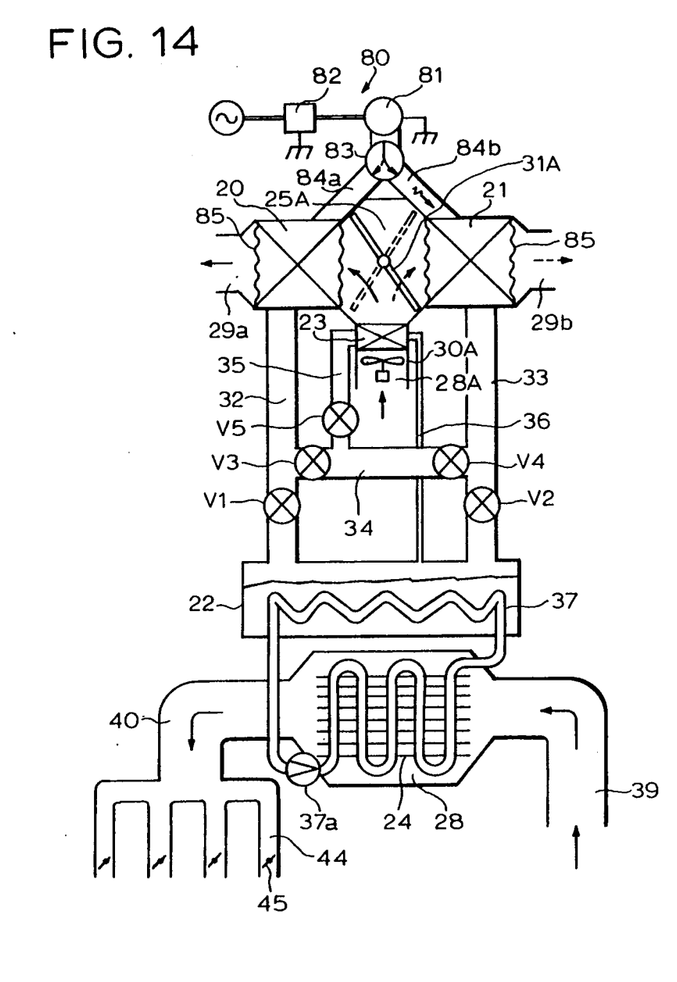
FIG. 14 shows an adsorption cooling system of the fifth embodiment of the present invention, in which microwave is utilized to heat the adsorbers.

Now, the fifth embodiment of the adsorption cooling system of the present invention will be explained in reference to FIG. 4.

FIG. 14 shows an adsorption cooling system of the fifth embodiment, in which microwave is utilized to heat the adsorbers. The like reference characters denote the like elements in FIGS. 1, 2 and 14. The basic construction of the cooling system of the fifth embodiment is substantially the same as the system of the first embodiment shown in FIGS. 1 and 2. The construction of any parts not particularly explained should be regarded as identical to those shown in FIGS. 1 and 2.

In FIG. 14, a first adsorber 20 and a second adsorber 21 are disposed with a central plenum 25A intervening therebetween. An external air intake passage 28A having a blower 30A therein is arranged generally between the first and the second adsorbers 20, 21. A condenser 23 is placed at the inside end of the external air intake passage 28A, and the central plenum 25A is on the inner side of the condenser 23. A first exhaust passage 29a is arranged on the outside of the first adsorber 20, and a second exhaust passage 29b is arranged on the outside of the second adsorber 21. In the central plenum 25A and between the first and the second adsorbers 20, 21 is installed a switching flap 31A. The switching flap 31A alternatively directs the external air, supplied from the external air intake passage 28A through the condenser 23, to either the first adsorber 20 or the second adsorber 21.

The system of the fifth embodiment has a microwave heating device 80 for heating the first and the second adsorbers 20, 21. The microwave heating device 80 includes a microwave oscillator 81 having a magnetton (not shown), which is powered by an electric power source 82 including a high voltage transformer (not shown). The microwave generated by the oscillator 81 is alternatively switched by a switch 83 and transmitted into the first adsorber 20 through a first microwave path 84a and into the second adsorber 21 through a second microwave path 84b, so that the first adsorbent 20a (not shown) in the first adsorber 20 and the second adsorbent 21a (not shown) in the second adsorber 21 are alternatively heated by the microwave energy. The frequency of the microwave generated by the oscillator 81 is 2,450 MHz which is considered to be proper for heating the adsorbents. Both the air intake side and the exhaust side of each of the first and the second adsorbers 20, 21 are shielded by metal mesh 85 so as to avoid leakage of the microwave from inside the adsorbers 20, 21.

In the construction described above, when, for example, the adsorption process is performed at the first adsorber 20 and the desorption process is simultaneously performed at the second adsorber 21, the switching flap 31A is set to the position illustrated by solid lines. Then, the external air taken into the central plenum 25A though the external air intake passage 28A and the condenser 23 is directed to the first adsorber 20, as shown by the solid line arrow. The air advances through the first adsorber 20 and is exhausted through the first exhaust passage 29a, so that the first adsorber 20 is cooled by the air. At the same time, the condenser 23 is also cooled by the air.

On the other hand, and at the same time, the microwave generated by the microwave oscillator 81 is being switched to the second microwave path 84b by the switch 83 and is transmitted into the second adsorber 21 via the second microwave path 84b, so that the adsorbent 21a of the second adsorber 21 is heated by the microwave energy.

When the processes of the first and the second adsorbers 20, 21 are the reverse of what has been described, the first adsorber 20, which will be in a desorption process, will be heated by the microwave heating device 80, and the second adsorber 21, which will be in an adsorption process, will be cooled by the external air. In this reversed step, the switching flap 31A is set to the position illustrated by broken lines to direct the air to the second adsorber 21 as shown by the broken line arrow, and at the same time, the microwave is switched by the switch 83 to the first microwave path 84a to be transmitted into the first adsorber 20 so as to heat the adsorbent 20a of the first adsorber 20.

The above described heating of the adsorbents 20a, 21a of the adsorbers 20, 21 by microwave actually means that the microwave is transmitted into the adsorbers 20, 21 alternatively and the respective adsorbents 20a, 21a are alternatively heated by the principle of induction heating. It should not be understood that microwave radiation is applied onto the adsorbers 20, 21.

By means of the microwave heating, the adsorbents 20a, 21a can be heated up quickly and evenly, and the time required for the desorption process is minimized. Thus, the time for each process cycle period is also shortened and the operation efficiency of the system in whole is enhanced.

It will be understood that various changes and modifications may be made in the above described embodiments which provide the characteristics of the present invention without departing from the spirit and principle thereof particularly as defined in the following claims.

What is claimed is:

1. An improved adsorption cooling system having
a pair of adsorbers, each containing adsorbent,
a cooling vessel containing an adsorbate,
a pair of adsorbate outgoing passages, one allowing the adsorbate to shift from the cooling vessel to one adsorber therethrough and the other allowing the adsorbate to shift from the cooling vessel to the other adsorber therethrough, and
means for cooling each of the adsorbers alternatively, and means for heating each of the adsorbers alternatively,
the system performing
an adsorption process for adsorbing the adsorbate in one of the adsorbers (defined as "adsorbing adsorber") by cooling the adsorber and, simultaneously,
a desorption process for desorbing and separating the adsorbate in the other adsorber (defined as "desorbing adsorber") by heating the adsorber and returning the separated adsorbate to the cooling vessel,
wherein
each of the two adsorbers has a first side and a second side,
the two adsorbers are disposed opposing each other with an intervening central plenum therebetween, said first side of each of the adsorbers facing said central plenum,
the means for cooling the adsorbers comprises an air supply means for supplying a low temperature ambient air to the adsorbing adsorber from the second side thereof and thereby cooling the adsorbing adsorber while the air is passing therethrough into the central plenum,
the means for heating the adsorbers comprises a gas supply means including a high temperature gas inlet passage for supplying a high temperature gas into said central plenum therethrough, and
the air having passed the adsorbing adsorber advances toward the desorbing adsorber confluxing with the high temperature gas supplied into said central plenum so that a blend of the high temperature gas and the air passes through the desorbing adsorber from the first side to the second side thereof, thereby heating the desorbing adsorber.

2. An improved adsorption cooling system according to claim 1, wherein each of the first sides of the adsorbers faces said high temperature gas inlet passage at an angle.

3. An improved adsorption cooling system according to claim 1,
wherein the system further comprising means for increasing the amount of the air supplied through the adsorbing adsorber into the central plenum when the amount of the gas supplied through said high temperature gas inlet passage decreases.

4. An improved adsorption cooling system according to claim 1, wherein the improvement further comprises:
(a) means for estimating the amount of heat of the high temperature gas in said high temperature gas inlet passage; and
(b) an air flow amount controller for, responsive to the amount of heat estimated by said means for estimating the amount of heat, regulating the amount of the air supplied to the adsorbing adsorber so that the amount of the air is made large when the estimated amount of heat is large and the amount of the air is made small when the estimated amount of heat is small.

5. An improved adsorption cooling system according to claim 1, wherein said high temperature gas is an exhaust gas of an engine.

6. An improved adsorption cooling system having
a pair of adsorbers, each containing adsorbent,
a cooling vessel containing an adsorbate,
a pair of adsorbate outgoing passages, one allowing the adsorbate to shift from the cooling vessel to one adsorber therethrough and the other allowing the adsorbate to shift from the cooling vessel to the other adsorber therethrough, and
means for cooling each of the adsorbers alternatively, and means for heating each of the adsorbers alternatively,
the system performing
an adsorption process for adsorbing the adsorbate in one of the adsorbers (defined as "adsorbing adsorber") by cooling the adsorber and, simultaneously,
a desorption process for desorbing and separating the adsorbate in the other adsorber (defined as "desorbing adsorber") by heating the adsorber and returning the separated adsorbate to the cooling vessel,
wherein the improvement comprises:
(a) means for measuring the amount of heat produced by the means for heating the adsorbers; and
(b) a process switchover controller for, responsive to the amount of heat measured by said heat measuring means, regulating the time period from one adsorption-desorption process to the succeeding desorption-adsorption process so that the time period is made long when the measured amount of heat is small and the time period is made short when the measured amount of heat is large.

* * * * *